(12) United States Patent
Kusakabe

(10) Patent No.: US 8,893,979 B2
(45) Date of Patent: Nov. 25, 2014

(54) THERMOSTAT DEVICE

(75) Inventor: Fumito Kusakabe, Tokyo (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 632 days.

(21) Appl. No.: 13/255,098

(22) PCT Filed: Feb. 17, 2010

(86) PCT No.: PCT/JP2010/052296
§ 371 (c)(1),
(2), (4) Date: Sep. 6, 2011

(87) PCT Pub. No.: WO2010/122832
PCT Pub. Date: Oct. 28, 2010

(65) Prior Publication Data
US 2012/0097750 A1    Apr. 26, 2012

(30) Foreign Application Priority Data

Apr. 24, 2009  (JP) .................................. 2009-106902

(51) Int. Cl.
*F01P 7/16*    (2006.01)
*G05D 23/02*   (2006.01)

(52) U.S. Cl.
CPC .................................... *G05D 23/022* (2013.01)
USPC ...... 236/34.5; 236/93 A; 236/99 J; 236/99 K; 236/100

(58) Field of Classification Search
USPC ........ 236/34.5, 93 R, 93 A, 99 R, 99 K, 99 J, 236/100; 137/468
See application file for complete search history.

(56) References Cited

U.S. PATENT DOCUMENTS 4,802,621 A * 2/1989 Standke ...................... 236/93 R
5,445,318 A * 8/1995 Michel ......................... 236/34.5
7,175,102 B2 * 2/2007 Inoue ............................ 236/100

FOREIGN PATENT DOCUMENTS

| JP | 1985-121598 U | 8/1985 |
| JP | 2004-308743 A | 6/2004 |
| JP | 2004-177249 A | 11/2004 |

* cited by examiner

*Primary Examiner* — Jonathan Bradford
(74) *Attorney, Agent, or Firm* — Joseph P. Farrar, Esq.

(57) ABSTRACT

A thermo-element having incorporated in a case a heat expansion body which expands and contracts according to a change in temperature includes: a piston disposed along the axis direction within the case, protruding outward from the opening on one end side of the case, and advancing and receding as the hear expansion body expands and contracts; a guide member disposed within the case and which slidably holds the piston; and a first valve element fitted to an outside portion of the case, in the side of the case, and opening and closing a fluid flow path. A fit-in section of the first valve element and insertion sections of the guide member inserted within the case are displaced from each other in the axis direction and the radial direction of the case.

4 Claims, 3 Drawing Sheets

THERMOSTAT DEVICE

BACKGROUND OF THE INVENTION

1. Technical Field

The present invention relates to a temperature-sensitive automatic valve thermostat device used to control the temperature of cooling water in a cooling water circuit of an internal combustion engine (hereinafter "engine") used in an automobile or the like that circulates the cooling water between the engine and a heat exchanger (hereinafter "radiator") to cool the engine, in which the device operates on changes in the temperature of the cooling water to switch the flow of engine cooling water, and more particularly, to a thermo-element comprised of a thermal expansion unit that expands and contracts with changes in the temperature of the cooling water or other detected body and a moving member (a piston) moved by the expansion and contraction of the thermal expansion unit.

2. Description of the Background Art

In an automobile engine, for example, in order to cool the engine a water cooled-type cooling system using a radiator is generally employed. Conventionally, in this type of cooling system, a thermostat using a thermal expansion member or an electrically controlled valve unit that adjusts the volume of cooling water that is circulated to the radiator is employed in order to be able to control the temperature of the cooling water that is introduced into the engine.

In the above-described thermostat device using a thermal expansion member, a control valve is disposed at a portion of the cooling water route, for example, at the intake or the exhaust ends of the route. If the cooling water temperature is too low, the control valve is closed, causing the cooling water to circulate through a bypass route without passing through the radiator. If the cooling water temperature has become too high, the control valve is opened, causing the cooling water to flow through the radiator. As a result, the temperature of the cooling water is maintained in the required state.

Conventionally a variety of different structures for this type of thermostat device are known, having a first valve at one end of the thermo-element that operates by changes in the temperature of a fluid, a second valve at the other end of the thermo-element, biasing means that bias the first valve toward a closed position, and a frame.

The thermo-element consists of a temperature sensor and a guide. A thermal expansion unit of wax or the like that senses the temperature of the fluid and expands and contracts is built into the temperature sensor. A piston is fitted into the guide, which protrudes from the tip of the temperature sensor. A flange configured as a single integrated unit with the frame is provided at the tip of the piston to hold back the piston.

The first valve is poppet-shaped, and provided on the guide. The flange acts as the seat of the first valve. In addition, the flange has a mount projecting therefrom into the cooling water route.

The second valve is mounted on a rod projecting from the distal end of the temperature sensor. Between the second valve and the temperature sensor, the second valve is spring-biased toward the tip of the rod.

In this type of thermostat device, for example, the first valve is positioned to open and close the cooling water route and the second valve is positioned to open and close the bypass route. Then, the thermal expansion unit inside the temperature sensor expands as the temperature of the cooling water rises, pushing against the piston, and the thermo-element operates against the force of the biasing means. As a result, the first valve moves to the open position and opens the cooling water route while the second valve moves to the closed position and closes the bypass route. Conversely, the thermal expansion unit contracts as the temperature of the cooling water declines and the pressure on the piston thus weakens, moving the first valve to the closed position to close the cooling water route while the second valve moves to the open position to open the bypass route. (See, for example, patent documents JP-2004-177249-A and JP-2004-308743-A.)

However, in the thermo-element having the conventional structure described above, the element case is made of stainless steel material and internal parts of the element case are configured with a structure that directly pushes out the piston using a U-shaped packing as a seal. In addition, with such a thermo-element, in an effort to reduce the number of parts, the amount of expensive and high-specific-gravity metal alloys such as brass, and cost, where used in an automobile thermostat the product weight decreases, thus providing advantages such as the ability to achieve improved fuel efficiency. Moreover, unlike the conventional brass case, the element case made of stainless steel material has a wide area of elastic deformation, with the advantage that it can absorb even sudden, drastic changes in internal pressure.

However, with the thermo-element having the conventional structure described above, problems of machining and assembly arise during assembly of the thermo-element, leading to an increase in cost. Some sort of measure capable of solving such problems is sought.

For example, a guide member that slidably holds the piston is inserted inside the thermo-element case, while the first valve is mounted and fixed on the outside. When such a first valve is fitted onto the case and fixed thereat, if the external diameter of the case is interfered with prior to such fitting, then the seal member cannot maintain a seal due to deformation of the case, for example, leading to inadequate durability (reliability). Moreover, there is the problem of an adverse effect on assembly.

SUMMARY OF THE INVENTION

The present invention is conceived in light of the above-described circumstances and has as its object a thermostat device that provides an uncomplicated, easy-to-assemble element assembly including the thermo-element of the thermostat device that is compact and lightweight while also possessing superior strength, durability, and friction resistance.

To achieve this object, the present invention (according to claim 1) provides a thermostat device having a thermal expansion unit that expands with a temperature increase and contracts with a temperature decrease, the thermal expansion unit built into a case so as to be susceptible to effects of heat from outside the case, the thermostat device comprising: a piston disposed inside the case along an axial direction of the case that advances and retreats with expansion and contraction of the thermal expansion unit, having an inner end that is immersed in the thermal expansion unit and an outer end that protrudes from an opening in one end of the case; a guide member that is inserted into the case from the opening in one end of the case and slidably holds the piston; a seal member that is inserted into the case from the opening in one end of the case and holds the thermal expansion unit so that the thermal expansion unit does not leak from a chamber in which it is contained; and a first valve fitted onto the exterior of the case near the opening in one end of the case that opens and closes a flowpath, wherein a portion of the case for fitting the first valve onto the exterior of the case, and portions of the case for inserting the guide member and the seal member, are disposed so as to be offset in an axial direction and in a diametrical direction of the case, and a diameter of a portion of the case that guides first valve onto the case is configured to be smaller than an outer diameter of the case where the first valve is fitted onto the case, and an inner diameter of the case where the guide member and the seal member are inserted into the case is configured to be smaller than the inner diameter of the case where first valve is fitted onto the case.

The present invention (according to claim 2) provides the thermostat device according to claim 1, wherein the guide member is configured to be insertable in the case without contacting an inner wall of the case where the first valve is fitted onto the case.

The present invention (according to claim 3) provides the thermostat device according to either claim 1 or claim 2, wherein the guide member inserted into the element case from one end thereof is provided with a circumferential groove, and an O-ring is provided in the circumferential groove that provides a seal between the element case and the guide member.

The present invention (according to claim 4) provides the thermostat device according to claim 1, wherein a coil spring that biases a second valve is held by a coil spring bearing member, the coil spring bearing member being configured to contact the element case.

The present invention (according to claim 5) provides the thermostat device according to either claim 1 or claim 4, wherein the element case and other parts related thereto are composed of the same type of material.

Effect of the Invention

As described above, according to the thermostat device of the present invention, because the fitted portion of the first valve that is fitted onto the exterior of the case and the portions of the seal between the case and the packing as well as the guide member that are inserted into the interior of the case are offset in the axial direction and in the diametrical direction of the case, despite the uncomplicated configuration, when the first valve is fitted it can be guided into place on the fitting portion of the case without harmful contact with the outer diameter of the element case corresponding to a chamber for the thermal expansion unit (wax), thus preventing the occurrence of unwanted variation in the amount of lift due to changes in the internal volume of the wax chamber. Moreover, the lack of harmful deformation of the seal has the advantage of improving the reliability of the seal against leakage of the thermal expansion unit (wax) after insertion and water-tightness of the inserted portion, as well as the reliability of the coupling.

Further, according to the present invention, the configuration described above allows the element case to be made thinner, and that thinness can improve the responsiveness of the thermal element, in particular its temperature sensing and operating performance.

In the thermostat device according to the present invention, the first valve is fitted after the thermal expansion unit (wax), the seal member (U packing), the buffer plate, and the guide member are inserted, the top of the case is capped and the element assembly is produced. If the inserted portions are not offset vertically (along the axis of the case) and in the diametrical direction of the case, the guide member would be improperly tightened as the first valve is guided into place and fitted and the portion of the guide member through which the piston slides would deform, increasing the sliding resistance of the piston and causing poor operation. In addition, if the fitted portion and the seal (inserted portion) of the U packing are not offset vertically (along the axis of the case) and in the diametrical direction of the case, the U packing would be improperly tightened as the first valve is guided into place and fitted and the portion of the guide member through which the piston slides would deform, affecting the case internal diameter dimensions at the seal and leading to an inability to secure a sufficient seal. In order to solve this problem, fitting the first valve first is conceivable, but doing so makes it impossible to secure sufficient insertion of the guide member and the U packing.

It is also conceivable to shave (cut) the inside of the case in order to fit the first valve after production of the element assembly described above, or to cut the inserted portions of the guide member and the seal member. However, the increase in the number of production steps and the increase in the thickness of the case as a whole and its weight due to the need to take into account the amount that is cut away make this approach problematic.

Further, because the inserted portion of the guide member and the fitted portion of the first valve are mutually offset, although at present the guide member is inserted first, conversely the first valve can be fitted first, thereby providing a greater degree of flexibility in the manufacturing process.

In addition, because the internal diameter of the case corresponding to the fitted portion of the first valve is set larger than the internal diameter of the case for the inserted portions of the guide member and the seal member, it can function as an insertion guide portion for the guide member and the U packing, and the guide member and the U packing can be inserted easily.

In particular, with the present invention, in addition to the fitted portion for the first valve, the portion for insertion of the guide member, and the portion for insertion of the U packing being offset along the axial direction of the case as described above, a step is provided so that the internal diameter of the case at the second portion for insertion of the guide member and the seal member into the case is smaller than the inner diameter of the case for fitting the first valve into place so as to form a space that can absorb the effects of any changes in the case internal diameter dimensions when the first valve is fitted into place, so that there is no risk of compressing the adjacent guide member and seal member.

Moreover, since strict dimensional tolerances are not necessary, the device can be configured with more inexpensive parts. Further, when the element case is capped and the assembly is produced, even if the fitted portion where the first valve is fitted is deformed by the capping it can be absorbed by the above-described space and does not affect other parts, thereby improving durability and reliability as well.

According to the present invention, by providing an O-ring in a circumferential groove of the guide member, entry of cooling water into the wax chamber from a gap between the guide member and the element case can be reliably prevented.

According to the present invention, by providing the element case with a coil spring bearing member, the problems that occurred with the conventional structure in which a coil spring that biased a second valve so as to directly contact the element case, such as an inability to secure an adequate set length of the coil spring, difficulty with producing the small-diameter portion of the coil spring nearest the element case, limitations on the size of the rod, and stress on the joint between the element case and the rod causing breakage of the joint, can be reliably prevented.

Further, according to the present invention, making the element case and the parts that comprise the thermostat, such as the first valve, the rod, the flange, the frame and the like of the same material makes it possible to obtain the following effects.

If the element case and the frame are made of the same type of material, then, with respect to the sliding parts, whereas in the conventional brass element case the frame is usually made of a different material such as stainless steel, the soft case body is unilaterally worn away. However, by making the element case and the frame of the same type of material (such as stainless steel), unilateral wear on the case can be minimized and moreover the can be made thinner and lightweight.

If the element case and the rod are made of the same type of material, then when using connecting means such as spot-welding it is possible to achieve a coupling of great strength with little energy.

Further, if the element case and the first valve are made of the same type of material, then by equalizing material characteristics (elastic deformation area, plastic deformation area) it becomes possible to insert the parts without extraordinary unilateral deformation or wear of one or the other, and even after fitting their mutual elasticity ensures a tight fit that improves water-tightness and reliability of the coupling.

DETAILED DESCRIPTION OF THE INVENTION

Figure 1:
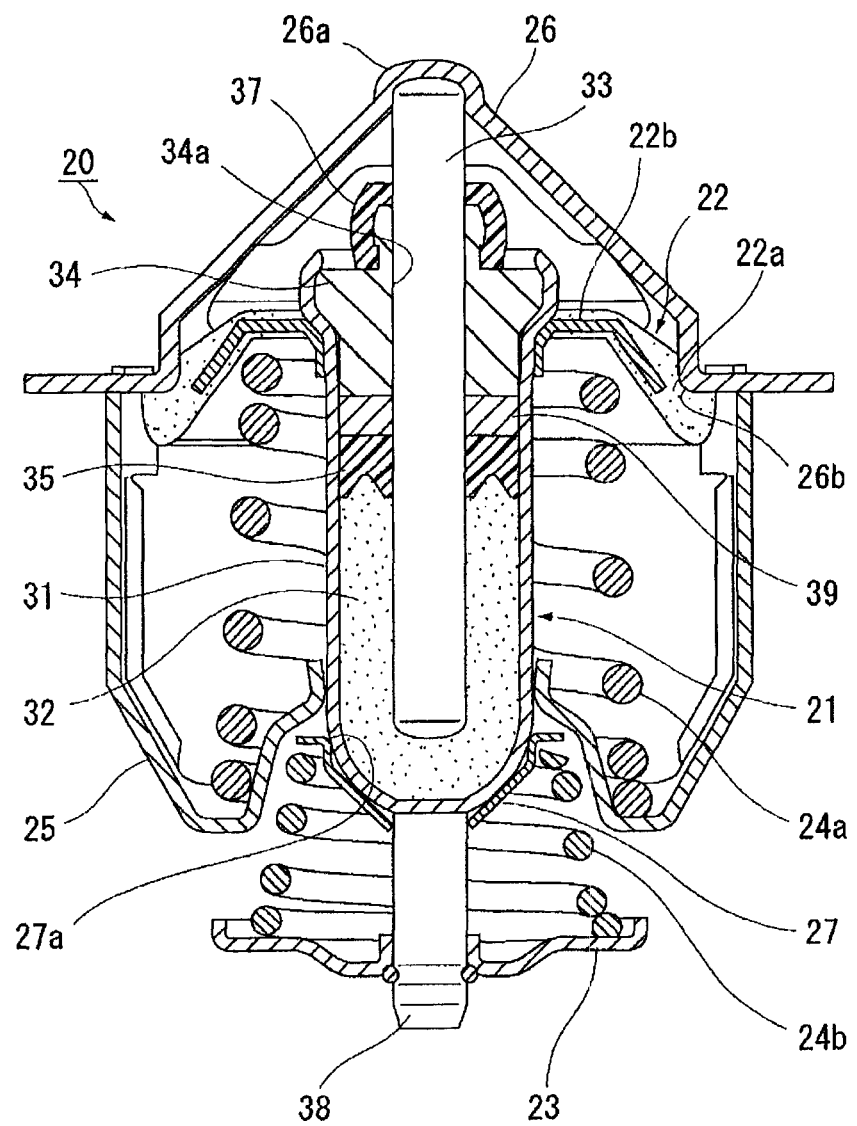
FIG. 1 is a schematic cross-sectional view of one embodiment of the thermostat device according to the present invention, showing the device as a whole.

FIG. 1 shows one embodiment of a thermostat device according to the present invention.

In FIG. 1, in a cooling water circuit for an automobile engine, a temperature-sensitive automatic valve thermostat device denoted by reference numeral 20 is disposed where a bypass flow route from the engine exhaust side and a cooling water route of the radiator side intersect. The thermostat device 20 is used to selectively switch the flow of cooling water through first and second fluid flowpaths comprised of these flow routes depending on the temperature of the cooling water and supply the cooling water to a cooling water route that extends to the engine intake.

As shown in FIG. 1, the thermostat device 20 has a thermo-element 21 as an operating part that operates on changes in temperature of the cooling water; first and second valves 22 and 23 formed integrally with or integrally provided to the thermo-element 21 that open and close first and second fluid flowpaths; a coil spring 24a as a biasing means that biases the first valve 22 toward a closed position; a coil spring 24b as a biasing means that biases the second valve 23 toward a closed position; a frame 25 that surrounds these elements; and a coil spring bearing member (retainer) 27.

On top of the frame 25, and attached to the frame 25, is a flange 26 having an upwardly projecting engagement portion 26a that engages a top tip of a later-described piston of the thermo-element 21. A gasket is provided to an outer circumference of the flange 26, and is retained and held in place to maintain watertightness of a portion of a device housing. A valve seat 26b for the first valve 22 is provided on an inner edge portion of the flange 26. Thus is configured the first valve that controls the flow of the cooling water in the first fluid flowpath.

The thermo-element 21 is configured as shown.

More specifically, the thermo-element 21 includes a metal element case 31 composed of a hollow container that is cylindrical in shape, has a bottom, and is substantially uniform in diameter, into the bottom of which wax 32 is inserted as a thermal expansion unit that thermally expands and thermally contracts when subjected to the effects of heat from an external source.

The element case 31 is pressed or cast, and comprised of a material such as stainless steel.

A piston 33 is disposed inside the case 31 along the axial direction thereof, an inner end of which is immersed in the wax 32 and an outer end of which protrudes from an opening in the case 31. The piston 33 is configured to advance and retreat along the axis with the expansion and contraction of the wax 32. Retraction of the piston 33 into the interior of the case 31 is carried out by the biasing force of an externally provided return spring or the like (in the present embodiment, the coil spring 24a).

In the drawing, reference numeral 34 denotes a guide member that slidably holds the piston 33. The guide member 34 is formed into a substantially cylindrical shape, and is inserted into the interior of the case 31 from one end (the open end) thereof.

A U packing 35 is disposed at an inner end of the guide member 34 inside the case 31 as a seal member that seals the wax 32 in the bottom of the case 31. Reference numeral 34a in the drawing denotes a through-hole that slidably holds the piston 33.

Reference numeral 39 denotes a back-up plate interposed between the U packing 35 and the guide member 34 inside the case 31, which prevents entry of packing subjected to the force of expansion of the wax into the gap between the guide and the case and between the piston and the guide.

A poppet-shaped member (22) having a substantially poppet-like shape that engages the outer end of the guide member 34 is fitted onto an outer peripheral portion of the opening in the case 31 and inserted, to form a single integrated unit with the first valve 22.

In FIG. 1, reference numeral 22a denotes a covering composed of a heat-resistant compound resin or rubber member. The covering 22a covers the surface of a metal core 22b of the poppet-shaped member 22, and functions as a seat portion that is seated on the valve seat 26b.

In addition, in FIG. 1, reference numeral 37 denotes a boot covering the outer end side of the guide 34.

Further, reference numeral 38 denotes a rod fixedly attached to the bottom of the case 31 by soldering or the like and extending axially therealong.

The thermostat device 20 described above is produced by inserting the thermal expansion unit (wax) 32, the U packing 35, and the back-up plate 39 into the interior of the case 31, then inserting the guide member 34 and capping the top of the case 31 to produce the element assembly, after which the first valve (the poppet-shaped member) 22 is pressed into place and the flange, frame, and other parts are assembled.

The thermo-element 21 configured as described above resolves all the problems of the hitherto common sleeve-type or diaphragm-type thermo-element, holds the number of constituent parts to the minimum required, reduces costs, and moreover provides reciprocal movement of the necessary stroke of the piston due to volumetric changes attendant upon expansion and contraction of the thermal expansion unit, as well as superior responsiveness and durability.

Further, in the above-described thermo-element 21, the shape and structure of the case 31, the guide member 34, and the like are greatly simplified, providing the advantage of even more effective thinness, compactness, processing, assembly, cost reduction, and lightness.

In the thermostat device 20 having the configuration described above, when the cooling water temperature is low the piston 3 is immersed in the wax 32 and protrudes only a relatively small amount from the case 31. At this time, the thermo-element 21 is biased by the force of the coil spring 24a upward in the drawing, closing the first valve 22.

As the temperature of the cooling water rises, that state is transmitted to the temperature sensor of the thermo-element 21 and the wax 32 expands, pushing the piston 33 out. At this time, because the piston 33 is engaged by the flange 26, the case 31 of the thermo-element 21 moves downward, opening the first valve 22.

The rod 38 passes through a hole in the center of the retainer 27, and the retainer 27 is contacted against the element case 31 by the force of the coil spring at at least one place other than a coupling between it and the rod 38, such as a tapered part of the retainer 27. The point of contact with the coil spring 24b is higher than the junction between the element case and the rod. The tapered portion contacts the element case 31 at a hemispherical portion of great strength that forms the bottom of the element case 31. Further, the retainer 27 may contact the element case 31 at two places on a flanged-shaped shoulder 27a of the retainer 27.

Figure 2:
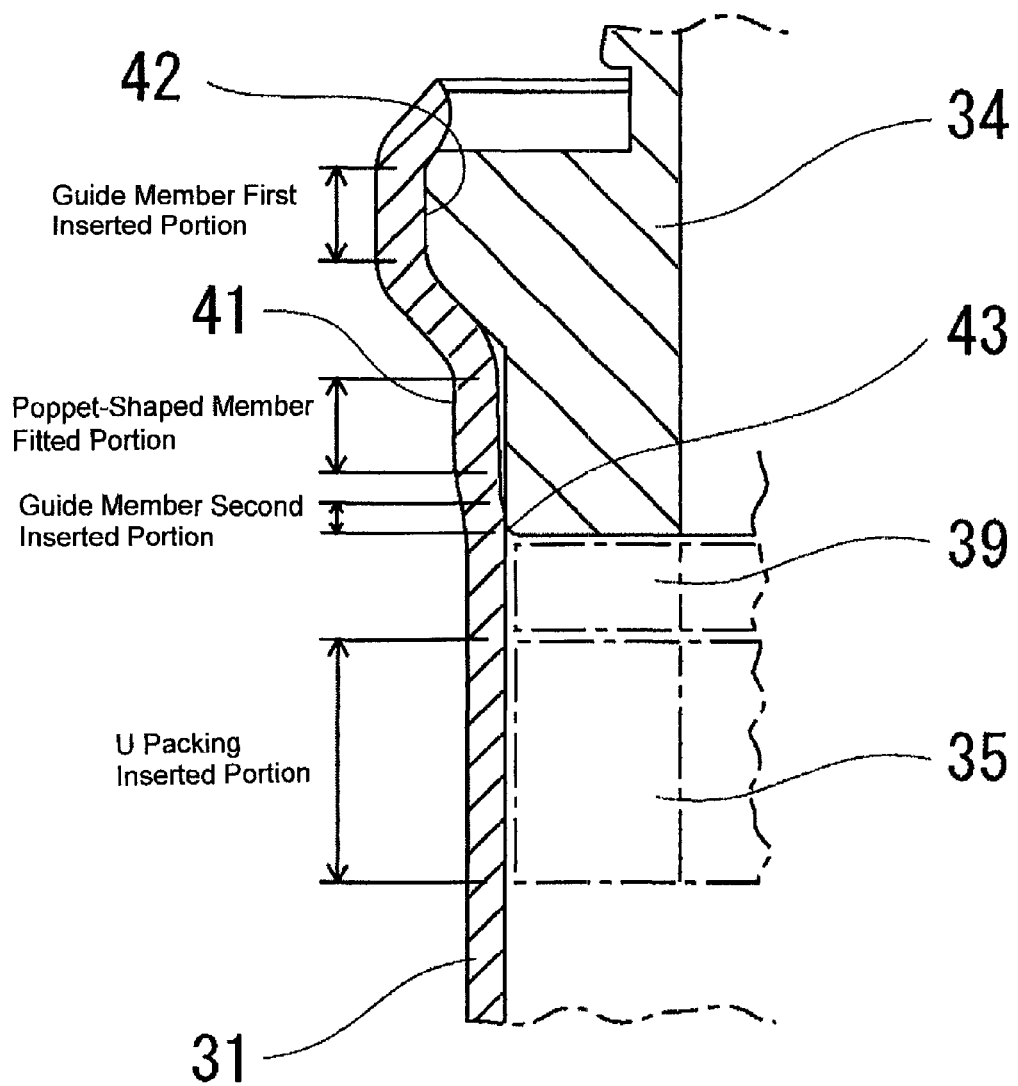
FIG. 2 is a partial enlarged cross-sectional view of main elements of the thermostat device according to the present invention, including an element case.

In the thermostat device 20 configured as described above, according to the present invention, as shown in FIG. 2, a portion 41 of the case where the poppet-shaped member (22) that is the first valve having the shape of a poppet is fitted onto the exterior of the case 31, first and second portions 42 and 43 of the case where the guide member 34 is inserted into the interior of the case 31, and a portion of the case where the seal member (U packing) 35 is inserted into the interior of the case 31 are arranged so as to be offset in the axial direction and in the diametrical direction of the case 31. At the same time, the inner diameter of the case 31 where the poppet-shaped member 22 is guided onto the case 31 is configured to be smaller than the inner diameter of the case 31 where the poppet-shaped member 22 is fitted onto the case, and moreover, the inner diameter of the case at the second portion 43 of the case and the portion of the case where the seal member (U packing) 35 are inserted is configured to be smaller than the inner diameter of the portion 41 of the case where the first valve (poppet-shaped member) 22 is fitted onto the case.

Further, the inner diameter of a guide member 34 first inserted portion of the case 31 is configured to be larger than the inner diameter of the case 31 where the first valve 22 is fitted onto the case 31.

With such a configuration, a step is provided that guides the poppet-shaped first valve (poppet-shaped member) 22 accurately onto the portion 41, such that, when the first valve (poppet-shaped member) 22 is fitted, it can be guided into place on the portion without harmful contact with the outer diameter of the element case 31 corresponding to a chamber for the thermal expansion unit (the wax), and moreover, with the advantage that the reliability of water-tightness and coupling after fitting can be improved.

Moreover, because the guide member 34 avoids the inner wall of the case at the case portion 41 onto which the first valve is fitted and is held at two places by the first portion 42 and the second portion 43 of the case, fixing in place while axially deviated or slanted can be prevented more securely than when held at only one place, thus improving durability and reliability.

Here, "insertion" of the guide member 34 includes fitting or engaging to the extent that the guide member is fixedly held within the case. Provided that it is fixedly held, the shapes of the guide member and the inner diameter of the case into which the guide member is inserted can each be different.

According to the present invention, because a step is provided on the element case 31 during formation, the above-described cutting step becomes unnecessary. Moreover, because the case 31 is thinner, a reduction in weight as well as improved responsiveness is achieved.

Further, because the first and second portions 42 and 43 for the guide member 34 and the portion 41 for the first valve (poppet-shaped member) 22 are offset in mutually different ways, although at present the guide member 34 is inserted first, conversely, even if the first valve (poppet-shaped member) 22 were fitted into place first it would not affect the portions of the case for the guide member 31 and the seal member (U packing) 35, thereby providing a greater degree of flexibility in the manufacturing process.

In addition, because the inside of the case 31 corresponding to the portion 41 of the case for the first valve (poppet-shaped member) 22 functions as an insertion guide portion for the guide member 34 and the U packing 35, the guide member 34 and the U packing 35 can be inserted easily.

In particular, with the above-described configuration, in addition to the portion 41 for the first valve (poppet-shaped member) 22, the portion for insertion of the guide member 34, and further the portion for insertion of the U packing 35 being offset along the axial direction of the case 31 as described above, first and second portions 42 and 43 for insertion of the guide member 34 while avoiding the inner wall of the case 31 are provided, with a step provided so that the diameter of the case at the second portion for insertion of the guide member 34 is smaller than the inner diameter of the case 31 for fitting the first valve into place so as to form a space, such that when the first valve (poppet-shaped member) 22 is fitted into place the first valve (poppet-shaped member) 22 does not compress the seal (the U packing 35) and the guide member 34.

It should be noted that the guide member 34 first inserted portion 42 is formed so as to retain the first valve, and is set larger than the fitted portion diameter. This portion also functions as an insertion guide for the guide and the U packing.

Moreover, although in the present embodiment guide insertion portions are provided at two places, provided that the problem of axial deviation like that described above can be solved, the guide may be fixedly held in place at only one of the first and second portions 42 and 43 for insertion.

Further, the portion of the case 31 for guiding the first valve into place may be given a tapered shape of decreasing diameter from the insertion portion to the bottom of the case 31.

Moreover, when the element case 31 is capped and the element assembly is completed, even if the inserted portion of the first valve has been deformed by such capping the above-described space can absorb it. That is, if there is no such space the stress of fitting falls on the guide member 34, the seal 35, or the portions of the case corresponding to where these are inserted, and the guide member and the seal 35 will deform.

Figure 3:
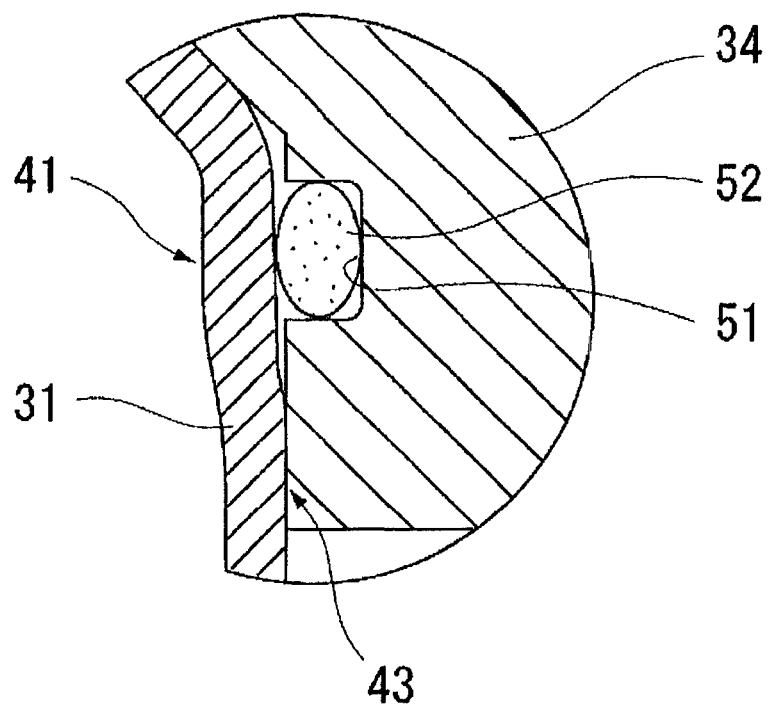
FIG. 3 is a partial enlarged cross-sectional view of main elements of another embodiment of the thermostat device according to the present invention.

Preferably, a circumferential groove 51 is provided at the portion that corresponds to the insertion guide portion for the guide member 34 described above as shown in FIG. 3 and an O-ring 52 is provided in the circumferential groove 51, thus achieving a reliable seal between the guide member 34 and the case 31.

By so doing, cooling water can be more reliably prevented from entering the wax chamber from the gap between the guide member 34 and the case 31.

Further, by providing the case 31 with the retainer 27 according to the present invention, the retainer 27 bears the biasing force of the coil spring 24b, and since the retainer 27 contacts the case 31 at the bottom of the case 31 at a location other than the coupling between the case 31 and the rod 38, the coupling is not subjected to the stress generated by the biasing force of the coil spring 24b. As a result, there is no possibility of the coupling shearing, making it possible to achieve a coupling of great strength with little energy when using connecting means such as spot welding or the like.

Preferably, by contacting the case 31 at multiple places with the shoulder 27a of the flange portion of the retainer 27 or the like, the stress generated by the biasing force of the coil spring 24b can be dispersed and transmitted to the case 31, so that the load on the bottom of the case 31 can be reduced and its durability improved, and moreover the bottom of the case 31 does not deform.

Moreover, because the point of contact between the coil spring 24b and the retainer 27 is higher than the coupling between the case 31 and the rod 38, the coil spring 24b can have a longer set length, thus increasing design flexibility. Further, the small-diameter portion of the coil spring 24b at the element case end can be made comparative large, facilitating machining.

Further, the seating of the retainer 27 on the case 31 further improves deformation toughness of the bottom of the case 31 and the like due to internal pressure of the case when the wax 32 expands.

In addition, because it is not necessary to provide a contact part on the bottom of the case 31 for the coil spring 24b as has conventionally been the case, the rod 38 can be made as large as necessary, thus providing greater design flexibility and securing an adequate coupling surface.

It should be noted that in the above-described thermostat device 20 the element case 31, on the one hand, and the other parts that adjoin it, slide over it, and contact it on the other, for example the poppet-shaped member that is the first valve 22, the rod 38, the frame 25, and the like that comprise the thermostat, can all be made of the same type of material, such as stainless steel.

In a configuration of this type, if for example the element case 31 and the frame 25 are made of the same type of material, then, with respect to the sliding parts, whereas in the conventional brass element case the case body is unilaterally worn away, the thermo-element becomes slanted and invites malfunctioning, by contrast, where the material is of the same type (for example, stainless steel), wear on the case 31 can be minimized and moreover the thermo-element 21 can be made thinner and lightweight.

If the element case 31 and the rod 38 are made of the same type of material (not limited to metallic material), then when using connecting means such as spot-welding or laser welding it is possible to achieve a coupling of great strength with little energy.

Further, if the element case 31 and the poppet-shaped first valve 22 are made of the same type of material (not limited to metallic material), then by equalizing material characteristics (elastic deformation area, plastic deformation area) it becomes possible to fit these parts without extraordinary deformation or wear of one or the other, and even after fitting their mutual elasticity ensures a tight fit that improves water-tightness and reliability of the coupling.

By making the element case 31 and the other parts that adjoin it, slide over it, and contact it of the same material, galvanic corrosion can be prevented.

The present invention is not limited to the structures described in the embodiments described above, and the shapes, structures, and materials of the various parts that comprise the thermostat device 20 can be varied and changed as needed.

The invention claimed is:

1. A thermostat device having a thermal expansion unit that expands with a temperature increase and contracts with a temperature decrease, the thermal expansion unit built into a case so as to be susceptible to effects of heat from outside the case, the thermostat device comprising:
   a piston disposed inside the case along an axial direction of the case and that advances and retreats with expansion and contraction of the thermal expansion unit, the piston having an inner end that is immersed in the thermal expansion unit and an outer end that protrudes from an opening in one end of the case;
   a guide member that is inserted into the case from the opening in one end of the case and slidably holds the piston;
   a seal member that is inserted into the case from the opening in one end of the case and holds the thermal expansion unit so that the thermal expansion unit does not leak from a chamber in which it is contained; and
   a first valve fitted onto the exterior of the case at one end of the case and that opens and closes a flowpath,
   wherein a portion of the case for fitting the first valve onto the exterior of the case, portions of the case for inserting the guide member, and a portion of the case for inserting the seal member are disposed so as to be offset from each other in an axial direction and in a diametrical direction of the case, and
   a diameter of a portion of the case that guides the first valve onto the case is configured to be smaller than an outer diameter of the case where the first valve is fitted onto the case, and inner diameters of the case where the guide member and the seal member are inserted into the case are configured to be smaller than the inner diameter of the case where first valve is fitted onto the case.

2. The thermostat device according to claim 1, wherein the guide member is configured to be insertable in the case without contacting an inner wall of the case where the first valve is fitted onto the case.

3. The thermostat device according to claim 1, wherein the guide member inserted into the element case from one end thereof is provided with a circumferential groove, and an O-ring is provided in the circumferential groove that provides a seal between the element case and the guide member.

4. The thermostat device according to claim 1, wherein a coil spring that biases a second valve is held by a coil spring bearing member,
   the coil spring bearing member being configured to contact the element case.

* * * * *